P. Schrag,
Making Pottery.
N° 14,537. Patented Mar. 25, 1856.
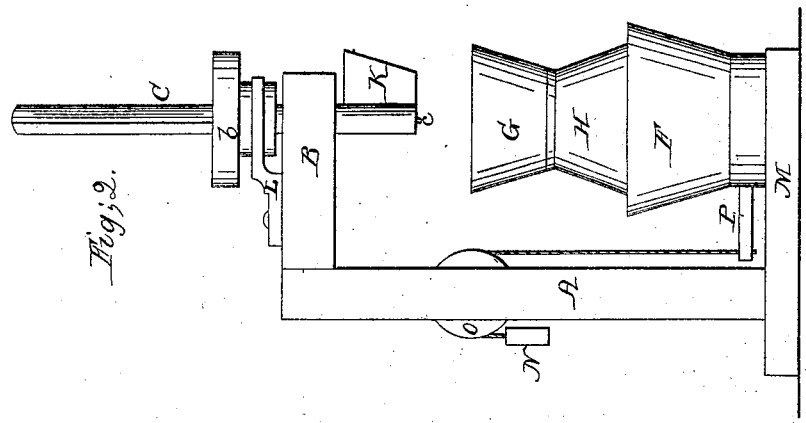
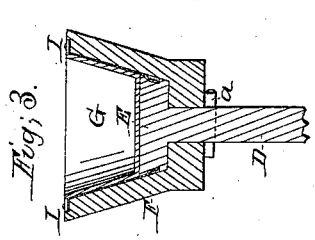 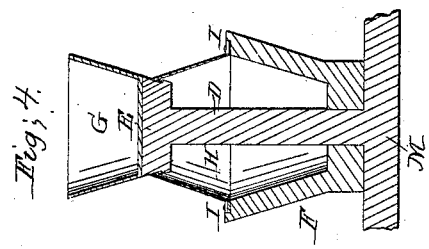
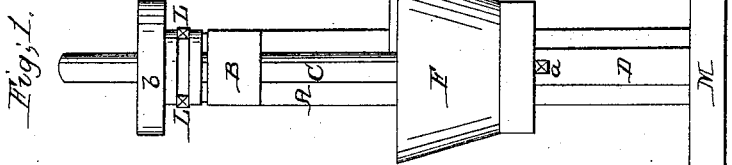
Witnesses:
I. W. Goddard
F. W. Howard
Inventor:
Philip Schrag

UNITED STATES PATENT OFFICE.

PHILIP SCHRAG, OF WASHINGTON, DISTRICT OF COLUMBIA.

MOLD FOR EARTHEN VESSELS, POTS, &c.

Specification of Letters Patent No. 14,537, dated March 25, 1856.

*To all whom it may concern:*

Be it known that I, PHILIP SCHRAG, of Washington, in the District of Columbia, have invented a new and useful Machine for Manufacturing Vessels of Earthenware; and I do hereby declare that the following is a full, clear, and exact description of the construction and operation of the same, reference being had to the annexed drawings, making a part of this specification, in which—

Figure 1, is a front elevation or external view, in which the lining fits tightly to the sides of the mold, the arbor and flanch being in the same and the vessel is to be manufactured. Fig. 2, is a side elevation or view, the vessel being manufactured, the arbor and flanch are raised, the mold forced down, the lining peeled off from the vessel and the vessel standing free on the bottom plate, ready to be cut off by a wire and put aside. Fig. 3, is a vertical section through the mold and support of the vessel, in Fig. 1, showing the position of the mold, lining and vessel in the state of manufacturing the latter. Fig. 4, is vertical section through the mold and the support of the vessel in Fig. 2, showing the position of the mold, lining and vessel after the manufacture of the latter, ready to be removed.

Similar letters of reference in each of the several figures indicate corresponding parts.

The nature of my invention consists in the combination of the mold made in two separate parts and the lining of the same with india rubber or any other suitable material, which having the exact shape and form of the mold, fits snugly to the same and abolishes the adhering of the clay on the mold. This lining is attached on its upper end on the mold, and on its lower extremity on the bottom plate. This bottom plate is detached from the mold, made stationary and has the form of the bottom of the vessel to be made. By forcing the mold down the lining, having no adhesion to the same, separates easily from the mold and sticks to the vessel, from which it is peeled off, forced to follow the moving down of the mold, the upper part of the lining as described fastened on the top of the same.

By the application of this lining, I am able to manufacture any amount of earthen vessels in the same mold; the manufactured article can be removed as soon as finished and others manufactured in uninterrupted succession.

Although vessels have been turned previously in molds by chablons on common turn-benches, however the manufactured vessels could not be moved out of the mold as long as they were in a moist or wet state, on account of the adhesion of the clay to the mold; they had to be put aside with the mold, till they become more dry and shrunk so much as to allow their falling out of the mold. To carry on the turning of vessels in succession, a certain amount of molds was necessary so that the last was in operation when the vessel in the first could be moved out. Although the turning of earthen vessels in molds by chablons saves a great deal of time in regard to the turning by hand, yet the removing of so many molds, the setting of the same each time in the center of the turnbench, not regarded the very considerable costs of so many molds, had the effect to draw the above mentioned advantage in the shade.

By my invention of the application of the india rubber lining I am able not only to make with one mold any amount of earthen vessels, but I get the same out of the mold nearly immediately after they are finished, having overcome all the difficulties above mentioned and secured the advantage.

To enable others skilled in the art to make and use my invention, I shall proceed to describe its construction and operation.

A is a vertical post or support, Fig. 1 and 2, on which an arm B is secured, to keep the arbor C in a vertical position. This arbor C can be moved up and down. On the same arm B is fastened a claw L, which keeps the pulley *b* in a horizontal position, not allowing the same to be moved in any vertical direction by the moving up and down of the arbor. The pulley 6 has a stick which fits in a slot on the arbor C running along his whole length, and by means of said stick and slot the arbor is kept rotating, when moved up and down. A belt around the pulley *b* communicates the motive power, and rotates the pulley and by that the arbor. On the lower end of the arbor is attached by any means a flanch or chablon K, having the exact outlines of the inside of the vessel to be turned. On the bottom plate M on which the post A is firmly secured, is also fastened the post or support D. This post D, of a rectangular section has on its top secured the plate E, which has a conical form, the upper diameter being of the same length as that of the bottom of the vessel. The mold F has inside the same form and shape as the vessel to be made, in addition to the bottom plate E, and in its bottom, on which the plate E rests, is a square hole, in which the post D fits exactly and on which post D therefore the mold F can be moved up and down easily. When the mold is in its upper position, the bottom of the same pressing against the plate E (as shown in Fig. 3 in section) it is fastened in that position by the stick $a$, passing through a hole in the post D under the mold. The plate E has of course to be secured to the post D not before the mold F is shoved over this post.

The lining H, being of india rubber or any other suitable material without any seam, has the exact shape and form of the vessel to be made and is fastened on the upper part of the mold by a ring I; its upper extremities passing between the ring and the mold and the ring firmly screwed to the mold. The lower end of the lining is shoved over the plate E and fastened there with a string, which fits in a groove, so that no part of the same may hinder the moving down of the mold. The lower end of the lining is first screwed to the plate E, then the upper end, by moving up the mold in its upper position, fitting the lining tightly to the same and bending around the upper end of the lining, on the top of the mold and screwing on the ring. The mold F is balanced by a counter-weight N on a cord passing around a roller O and fastened on a projection P of the mold F so as to facilitate its movement. On the lower end of the arbor C is fastened a pin $c$, exactly of the same height as the thickness of the bottom of the vessel to be made to prevent the going down of the arbor to the bottom plate E, and leaving sufficient space for the bottom of the vessel.

*Operation:* After the mold is shoved over the post D the plate E secured and the lining fastened as described above, the mold F is moved in its upper position and secured there by the stick $a$; the lining H fits now snugly to the mold and a sufficient quantity of clay may now be drawn in. The arbor C, which was till now in its upper position, is pressed down, a rotary motion given to the pulley $b$, will be communicated to the arbor and the flanch K and the inside of the vessel to be made, will be turned accordingly.

When the flanch K has formed the inside of the vessel, the arbor will be raised up in its former position, the rotation of the pulley stopped, and when the stick $a$ is then taken out, the mold F will either fall down by its weight or may be forced to do so. The vessel will remain firmly on the plate E and the lining will be peeled off. The machine will then have a view as shown in Fig. 2, and in section in Fig. 4. The vessel can then be cut off by a wire, put on a board near at hand, the mold F moved up again and the operation carried out once more as just described.

It will be seen that the different mechanical contrivances to execute the above named object are not very perfect, but as they do not form any part of my claim I did not think it necessary to elaboate them more.

Instead of moving down the mold by hand with the aid of a counterweight this could be done by the machine itself by means of screws or toothed rods or any other contrivances, which are set in motion by the motive power. The mold itself can also be constructed in cases where the vessels are narrower in the center than on their ends, in such a manner that they are made in parts, which are moved horizontally from and to the lining, before the mold is forced down and up. The arbor C may also get any other shape more adapted to its use and the rotating of the same as well as its vertical movement may be achieved by the motive power. All these arrangements are known mechanical contrivances and may be altered after need, when the machine is set to work, to facilitate its quicker working.

I do not claim the turning of earthen vessels in molds by chablons, nor the mere use of a lining to prevent adhesion of the clay to the mold; but

What I claim as my invention and want to secure by Letters Patent is:

The combination of the mold, made in two separate parts, one for the sides, the other for the bottom of the vessels, with the lining of the same with india rubber or any other suitable material, which is fastened on both parts of said mold in the manner and for the purpose substantially as hereinbefore described.

Washington D. C Febr. 25th 1856.

PHILIP SCHRAG.

Witnesses:
J. H. GODDARD,
F. W. HOWARD.